United States Patent
Bulat et al.

(10) Patent No.: US 12,235,931 B2
(45) Date of Patent: Feb. 25, 2025

(54) METHODS FOR TRAINING AND ANALYSING INPUT DATA USING A MACHINE LEARNING MODEL

(71) Applicant: SAMSUNG ELECTRONICS CO., LTD., Suwon-si (KR)

(72) Inventors: Adrian Bulat, Staines (GB); Georgios Tzimiropoulos Tzimiropoulos, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 415 days.

(21) Appl. No.: 17/728,281

(22) Filed: Apr. 25, 2022

(65) Prior Publication Data
US 2022/0284240 A1 Sep. 8, 2022

Related U.S. Application Data

(63) Continuation of application No. PCT/KR2022/001223, filed on Jan. 24, 2022.

(30) Foreign Application Priority Data

Mar. 8, 2021 (GR) .............................. 20210100140
Nov. 23, 2021 (GB) ..................................... 2116856

(51) Int. Cl.
G06N 3/04 (2023.01)
G06F 18/214 (2023.01)
G06N 3/08 (2023.01)

(52) U.S. Cl.
CPC ........... *G06F 18/2148* (2023.01); *G06N 3/04* (2013.01); *G06N 3/08* (2013.01)

(58) Field of Classification Search
CPC ........ G06N 3/0495; G06N 3/08; G06N 3/082; G06N 3/045; G06N 3/0464; G06N 3/048;
(Continued)

(56) References Cited

U.S. PATENT DOCUMENTS

2016/0328647 A1* 11/2016 Lin ........................ G06F 17/11
2019/0347550 A1  11/2019 Jung et al.
(Continued)

FOREIGN PATENT DOCUMENTS

CN 111582432 A 8/2020
CN 111898750 A 11/2020
(Continued)

OTHER PUBLICATIONS

Yu et al. "Any-precision deep neural networks"; Proceedings of the AAAI Conference on Artificial Intelligence; vol. 35. No. 12. (Year: 2021).*

(Continued)

*Primary Examiner* — Sumati Lefkowitz
*Assistant Examiner* — Michael Adam Shariff
(74) *Attorney, Agent, or Firm* — Sughrue Mion, PLLC

(57) ABSTRACT

Broadly speaking, the present techniques generally relate to machine learning models comprising neural network layers, in which the quantisation level of each layer of the model can be independently selected at run-time. In particular, the present application relates to a computer-implemented method for analysing input data on a device using a trained machine learning, ML, model, comprising independently selecting a quantisation level for each of a plurality of network layers of the model at runtime. The present application also relates to a computer-implemented method of training a machine learning model so that the quantisation level of each of the plurality of network layers is independently selectable at runtime. A single trained model with a single set of weights can therefore be deployed, with the quantisation of each layer selected at runtime to suit the capabilities of the device and available resource.

9 Claims, 11 Drawing Sheets

(58) Field of Classification Search
CPC .......... G06N 3/084; G06N 3/063; G06N 3/04; G06F 18/217; G06F 18/24133; G06F 18/2148

See application file for complete search history.

(56) References Cited

U.S. PATENT DOCUMENTS

| | | | |
|---|---|---|---|
| 2020/0134461 A1 | 4/2020 | Chai et al. | |
| 2020/0202218 A1 | 6/2020 | Csefalvay | |
| 2020/0302298 A1 | 9/2020 | Van Baalen et al. | |
| 2022/0101133 A1* | 3/2022 | Ardywibowo | G06N 3/084 |

FOREIGN PATENT DOCUMENTS

| | | |
|---|---|---|
| CN | 112183742 A | 1/2021 |
| CN | 112926570 B | 1/2023 |

OTHER PUBLICATIONS

Combined Search & Examination Report dated Sep. 9, 2022 issued by the United Kingdom Patent Office in application No. GB2116856.2.

Guerra, L., et al., "Switchable Precision Neural Networks", Cornell University Library, Feb. 7, 2020, pp. 1-10.

Cai, H., et al., "Once-For-All: Train One Network and Specialize It For Efficient Deployment", arXiv:1908.09791v5 [cs.LG], Apr. 29, 2020, pp. 1-15.

Communication dated May 11, 2022, issued by the International Searching Authority in counterpart International Application No. PCT/KR2022/001223 (PCT/ISA/210 and PCT/ISA210/237).

Yu et al., "Any-Precision Deep Neural Networks," The Thirty-Fifth AAAI Conference on Artificial Intelligence (AAAI-21), pp. 10763-10771, Feb. 2021, Total 10 pages.

Zhu et al., "Adaptive Layerwise Quantization for Deep Neural Network Compression," 2018 IEEE International Conference on Multimedia and Expo (ICME), Oct. 2018, Total 7 pages.

Jin et al., "AdaBits: Neural Network Quantization with Adaptive Bit-Widths," 2020 IEEE/CVF Conference on Computer Vision and Pattern Recognition (CVPR), pp. 2143-2153, Aug. 2020, Total 12 pages.

Lin, D., D., et al., "Fixed Point Quantization of Deep Convolutional Networks", Proceedings of the 33rd International Conference on Machine Learning, JMLR: W&CP vol. 48, 10 pages. arXiv:1511.06393v3 [cs.LG] Jun. 2, 2016.

Communication issued Feb. 24, 2023 by the United Kingdom Patent Office in United Kingdom Patent Application No. 2116856.2.

Communication issued Jun. 23, 2023 by the Intellectual Property Office of the United Kingdom for United Kingdom Patent Application No. 2116856.2.

* cited by examiner

METHODS FOR TRAINING AND ANALYSING INPUT DATA USING A MACHINE LEARNING MODEL

CROSS-REFERENCE TO RELATED APPLICATION(S)

This application is a bypass continuation application of International PCT Application No. PCT/KR2022/001223, filed on Jan. 24, 2022, which is based on and claims priority to GR Application No. 20210100140, filed on Mar. 8, 2021, and GB Application No. 2116856.2, filed on Nov. 23, 2021, the disclosures of which are incorporated by reference herein in their entirety.

BACKGROUND

1. Field

The present application relates to methods and apparatuses for training a machine learning, ML, model having a plurality of neural network layers, wherein a quantisation level each of the neural network layers is independently selectable at runtime. The present application also relates to methods and apparatuses for analysing input data using a trained ML model having a plurality of neural network layers, wherein a quantisation level each of the neural network layers is independently selectable at runtime.

2. Description of Related Art

Neural networks, including Deep Neural Networks (DNNs) have reached state-of-the-art accuracy across a variety of computer vision and other machine learning tasks. Despite their unprecedented performance, directly deploying DNN models on devices with limited computational resources and/or battery remains prohibitive. To address this, solutions have emerged such as network pruning, networks compression and network quantization. Network quantization, which maps the floating-point values of the weights and/or activations of the neural network to integers represented by a predetermined number of bits (referred to as having a predetermined "bit-width"), significantly reduces computation and storage requirements. However, there is a trade-off between accuracy and speed, with lower bit-widths increasing processing speed and reducing storage requirements at the cost of accuracy.

There are also an ever-growing number of different hardware platforms that a developer needs to support, each with its own unique characteristics and capabilities. Perhaps more importantly, even on the same device the available resources can vary due to other concurrent processes running, battery level, temperature or simply prioritization. Accordingly, depending on the capabilities of the platform or the available resource, the optimal trade-off between accuracy and speed of the DNN will differ. For example, in a system with older hardware or less available computational resource a lower bit-width will be preferable. However, in a system with better hardware or more available resource, a higher bit-width can be used to provide better accuracy.

In some prior techniques, the bit-width of the entire network must be selected at training time. Accordingly, multiple models with different bit-widths must be trained to cater for the differing hardware characteristics. For example, separate background segmentation or face detection models must be trained for different smartphones and tablets having different hardware. Furthermore, if there is a desire to switch between different bit-widths on the same device, multiple models must also be trained and then stored on the device to allow selection between the stored models. The computational cost in training numerous models for carrying out the same task is significant, as is the inconvenience in maintaining and storing such models.

In view of the above, the present applicant has recognised the need for an improved quantisation technique for neural networks, wherein the bit-width of each layer of the network can be independently selected at run-time.

SUMMARY

According to an embodiment, a technical objective is to provide a computer-implemented method for analysing input data on a device using a trained machine learning, ML, model by independently selecting a quantisation level for each of the plurality of neural network layers of the ML model at runtime and analysing the received input data item using the selected quantisation levels.

In a first approach of the present techniques, there is provided a computer-implemented method for analysing input data on a device using a trained machine learning, ML, model comprising a plurality of neural network layers, the method comprising:
  receiving at least one input data item for analysis;
  independently selecting a quantisation level for each of the plurality of neural network layers at runtime; and
  analysing the received input data item using the selected quantisation level The quantisation level may be selected from a pre-defined set of quantisation levels. The ML model may use a single shared set of weights. The single shared set of weights may be used regardless of the selected quantisation level of each layer.

The trained ML model may comprise a transitional batch-normalisation layer disposed between a first neural network layer and a second neural network layer of the plurality of neural network layers. The transitional batch-normalisation layer may be configured to compensate for a change in feature distribution between a quantisation level of the first neural network layer and a quantisation level of the second neural network layer. The trained ML model may comprise transition batch-normalisation layers disposed between each consecutive pair of neural network layers of the ML model.

The ML model may be used to perform any processing, including classification or regression. The at least one input data item may comprise one or more of image data, audio data or text data. The ML model may carry out one of image classification, image segmentation, video compression/decompression, video encoding/decoding, speech recognition or text classification. The method may comprise receiving a plurality of input data items. The plurality of input data items may be frames of a moving image.

The method may comprise storing configuration data, the configuration data comprising a selection of quantisation levels. The selection of quantisation levels may correspond to a processing environment of a device upon which the ML model will be executed. The method may include selecting the quantisation levels of the layers of the network based on the stored configuration data. The configuration data may be stored in a configuration file. The processing environment may be one or more of the hardware configuration or properties, firmware configuration and/or operating system version of the device upon which the ML model will be executed.

The method may comprise storing a plurality of configuration data items; determining processing conditions of the device, and selecting a configuration data item of the plurality of stored configuration data items, based on the determined processing conditions. The plurality of configuration data items may each correspond to a different set of processing conditions. The processing conditions may include the available computational resource, for example including the availability of processor capacity, memory capacity, and an amount of remaining battery. Each of the configuration data items may correspond to different processing conditions present in the same processing environment.

The method may comprise storing first configuration data, and generating a plurality of items of second configuration data from the first configuration data by introducing noise into the first configuration data. The method may comprise calculating a latency associated with each of the plurality of items of second configuration data. The method may comprise selecting an item of second configuration data of the plurality of items of second configuration data having a lowest latency. The method may comprise introducing noise into the first configuration data by randomly changing a selected quantisation level associated with a plurality of neural layers of the machine learning model. The first configuration data may be associated metric may be associated with a performance metric, suitably an accuracy. The method may comprise storing a plurality of first configuration data items, receiving a desired performance metric and selecting the first configuration data from the stored plurality of first configuration data items associated with the desired performance metric. The steps of generating the plurality of items of second configuration data, calculating the latency and selecting the item of second configuration data may be carried out at run-time.

In a second approach of the present techniques, there is provided an apparatus comprising at least one processor, coupled to memory, arranged to carry out the method of the first approach.

The features described above with respect to the first approach apply equally to the second approach.

In a third approach of the present techniques, there is provided a computer-implemented method for training a machine learning, ML, model, the method comprising:

receiving a plurality of items of training data;

training the ML model with the plurality of items of training data, the ML model comprising a plurality of neural network layers, wherein the quantisation level of each of the plurality of network layers is independently selectable at runtime The method may comprise:

(a) training the ML model with real-valued weights and quantised activations, wherein at each iteration of the training activations of each neural network layer of the ML model is quantised to the same quantisation level; and/or (b) training the ML model with quantised weights and quantised activations, wherein at each iteration of the training weights and activations of each neural network layer of the ML model are quantised to the same quantisation level; and/or (c) training the ML model with quantised weights and quantised activations, wherein the weights and activations of each neural network layer of the ML model are quantised to independently-selected quantisation levels.

The method may comprise all of steps (a)-(c). In any or all of steps (a)-(c), the activations and/or weights may be quantised to a randomly selected quantisation level from a pre-defined set of quantisation levels at each iteration of training.

Step (c) may include randomly selecting at each iteration of the training between:

(c1) training the ML model with quantised weights and quantised activations, wherein weights and activations of each neural network layer of the ML model are quantised to the same quantisation level; and (c2) training the ML model with quantised weights and quantised activations, wherein at each iteration of the training weights and activations of each neural network layer of the ML model are quantised to independently-selected quantisation levels.

The method may include increasing the probability of selecting (c2) over time.

The method of the first approach and the method of the third approach may combined. Accordingly, the trained ML model used in the first approach may be trained according to the method of the third approach.

In a fourth approach of the present techniques, there is provided an apparatus comprising at least one processor, coupled to memory, arranged to carry out the method of the third approach.

In a related approach of the present techniques, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages, functional programming languages, and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g.

Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values. The neural network computation may be based on an activation function, also referred to as an activation.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist or comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which.

DETAILED DESCRIPTION

Broadly speaking, the present techniques generally relate to machine learning models comprising neural network layers, in which the quantisation level of each layer of the model can be independently selected at run-time. In particular, the present application relates to a computer-implemented method for analysing input data on a device using a trained machine learning, ML, model, comprising independently selecting a quantisation level for each of a plurality of network layers of the model at runtime. The present application also relates to a computer-implemented method of training a machine learning model so that the quantisation level of each of the plurality of network layers is independently selectable at runtime. A single trained model with a single set of weights can therefore be deployed, with the quantisation of each layer selected at runtime to suit the capabilities of the device and available resource.

Figure 1:
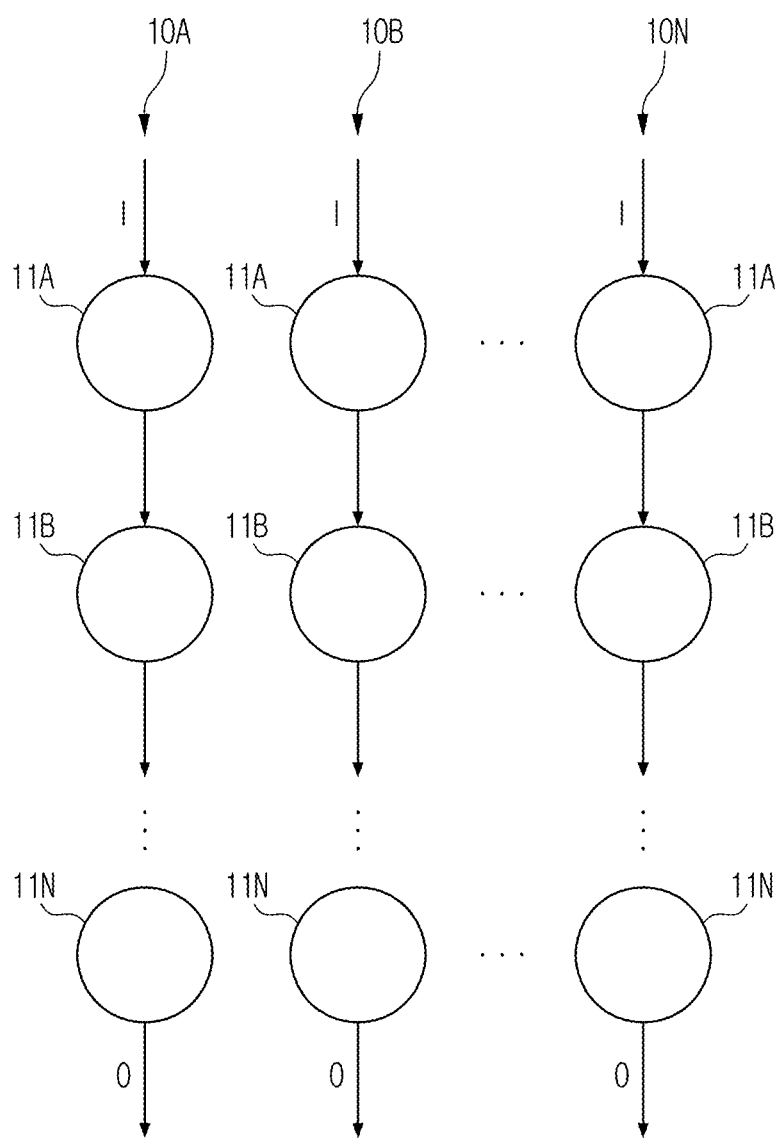
FIG. 1 is a schematic diagram of a plurality of neural networks according to a prior art example.

FIG. 1 shows a prior art example in which a plurality of neural networks 10A, 10B . . . 10N are provided. Each neural network 10 receives an input I, and provides an output O. The input may for example be an image, text, audio or any other suitable input to a neural network. Each neural network 10 processes the input through a plurality of neural network layers 11A, 11B . . . 11N to provide an output O. Each layer 11A-N is associated with weights derived from a training process. Furthermore, each layer 11A-N has an activation function which provides an output, hereinafter referred to as an "activation", to the subsequent layer. In an unquantized neural network, the weights and the activations are real values stored in floating-point representation. The output O may for example be a classification label, regression result, segmented image or any other suitable output that can be provided by a neural network.

In the example of FIG. 1, each of the neural networks 10A, 10B . . . 10N is quantised to a different quantisation level. The terms quantisation level and bit-width are used interchangeably throughout this disclosure. In other words, both the weights and activations are stored as integers that have a predetermined size, rather than as floating-point values. For example, network 10A may have a bit-width of 1, network 10B may have a bit-width of 2, and network 10N may have a bit-width of N. Each layer 11 of each the networks 10A-N has the same bit-width. The bit-width of the network 10 is selected during the training of the network 10 and cannot be changed without re-training the network 10. Accordingly, each network 10 has a different set of weights.

Figure 2:
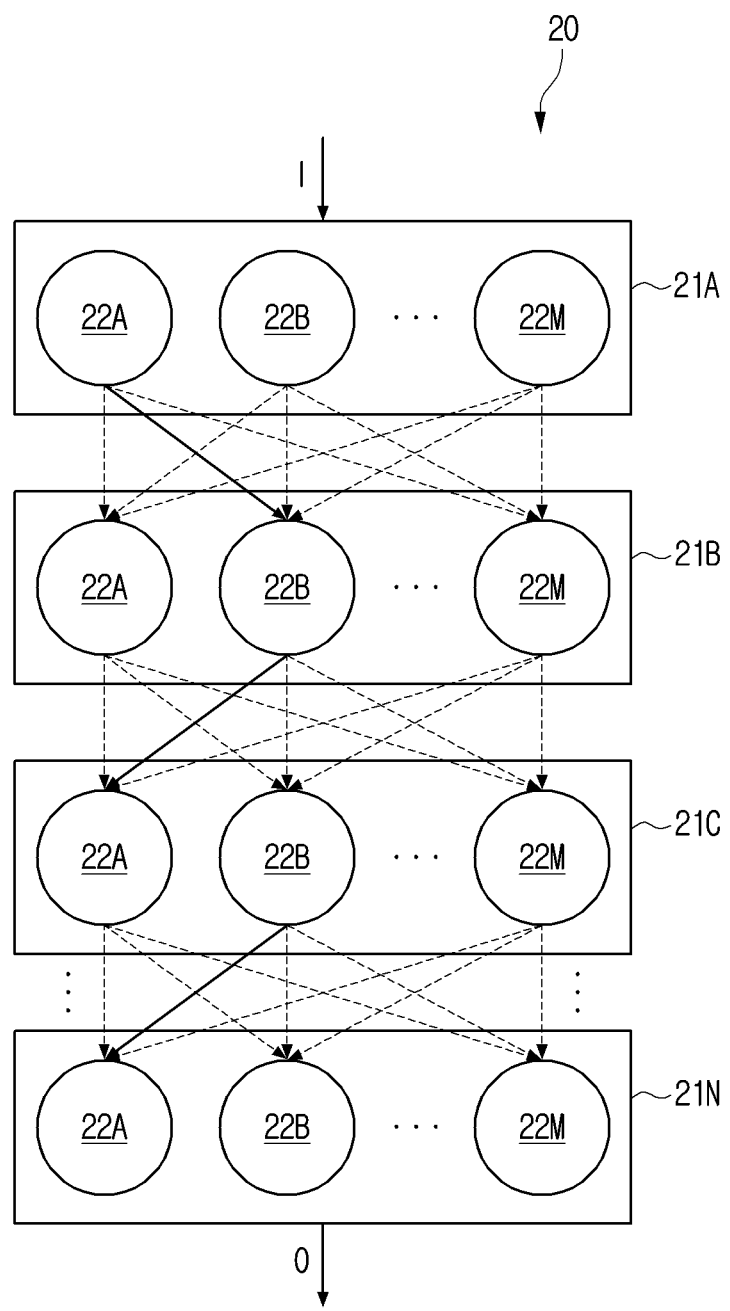
FIG. 2 is a schematic diagram of a neural network according to an example of the present techniques.

FIG. 2 is a schematic diagram illustrating a neural network 20 according to the present disclosure. Like the neural network 10, the neural network 20 takes an input I, processes it through a plurality of neural network layers 21A, 21B, 21C . . . 21N to provide an output O. However, in each layer 21, one of a plurality of bit-widths 22A, 22B . . . 22M may be selected. The plurality of bit-widths may be determined in advance, according to the needs of the application or devices to which the network 20 will be deployed. For example, the network 20 may have 4 bit-widths: 1, 2, 3 and 4. In other examples, more or fewer bit-widths may be selected, and different bit-widths may be selected.

The network 20 allows transition between different bit-widths 22 from layer 21 to layer 21. The dotted arrows on the figure represent possible data paths that could be selected, with the bold arrows representing the data path that is selected in the example. The selection can be made at run-time, also referred to as test-time or inference-time.

Accordingly, the neural network 20 can independently select the quantisation level on a per-layer basis at run-time. For each layer 21, the weight is shared across the various bit-widths 22A . . . 22M. In other words, the plurality of layers 21 use a single shared set of weights. By "independently select", it is meant that the selected quantisation level of each layer does not depend on the selected quantisation level of any other layer of the network. In other words, the selection of quantisation level of each layer is unconstrained.

More formally, for a given layer l, the quantization of the weights W and input activations A is denoted as $\text{quant}(W, b) = \tilde{W}_b$ and $\text{quant}(A,b) = \tilde{A}_b$, respectively, where $b = \{1, 2, \ldots, n\}$ denotes the bit-width.

The quantisation function quant handles both cases $b=1$ (binary networks) and $1 < b \leq n$. The quantisation function quantises both the activations and the weights between $(-m_b, m_b)$, where $m_b = 2^{b-1} - 1$ is the maximum value representable using b bits. Furthermore, the case $b=2$ degenerates in what is known as ternary quantization, allowing for further specific optimizations made possible by the induced sparsification, for example as discussed in Zhu, Chenzhuo, et al. "Trained ternary quantization." arXiv preprint arXiv: 1612.01064 (2016), the contents of which are incorporated herein by reference. Overall, the quantization scheme is defined as:

$$\tilde{W}_b = q_b(W) \quad (1)$$

$$\tilde{A}_b = q_b(A),$$

where the quantization function $q_b(x)$ is computed as:

$$q_b(x) = \alpha \times q'\left(\text{clip}\left(\frac{x}{\alpha}, -m_b, m_b\right)\right) \quad (2)$$

$$q'(x) = \begin{cases} \lfloor \cdot \rfloor, & \text{if } b > 1 \\ \text{sign}, & \text{if } b = 1 \end{cases}$$

where $\lfloor \cdot \rfloor$ is the floor rounding operator and $\alpha \in R$ represents the learnable scalar that defines the quantization step size. clip(z,r1,r2) returns z with values below r1 set to r1 and values above r2 set to r2.

For each layer and bit-width two such scalars may be learned, one for the weights and another for the activations. The use of the floor function allows the weights $\tilde{W}_i$ to be obtained directly from $\tilde{W}_{i+1}$ without the need of storing the full precision weights. This significantly reduces the model storage requirements, as its size is determined solely by the size of $\tilde{W}_n$.

Figure 3:
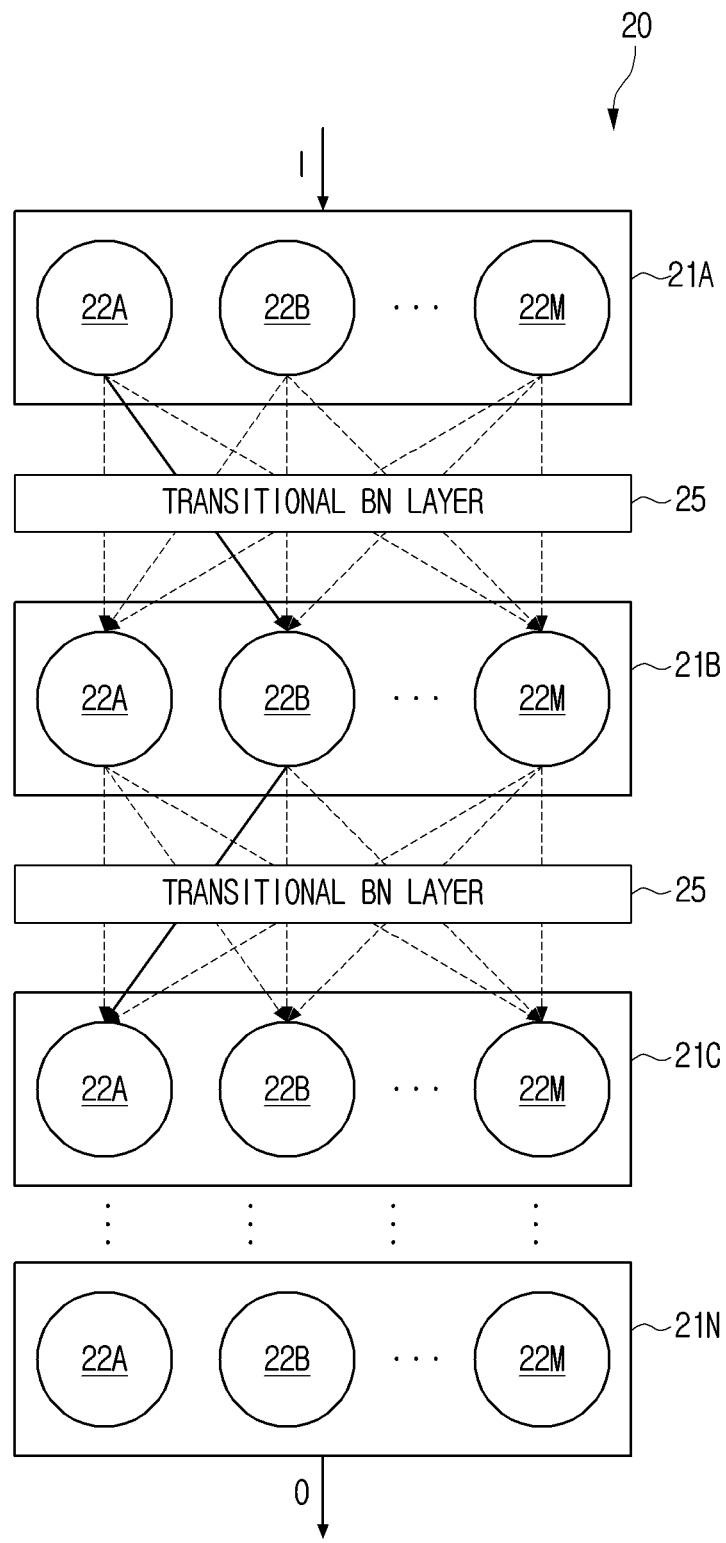
FIG. 3 is a schematic diagram of a neural network according to an example of the present techniques.

FIG. 3 is a schematic diagram illustrating the example neural network 20 in more detail. In the addition to the neural network layers 21, the neural network 20 may include a plurality of transitional batch normalisation (BN) layers 25.

BN is typically used in neural networks to mitigate for internal covariate shift, caused by randomness in the parameter initialization and the randomness in the input data of the network during training. The process of BN is disclosed in Ioffe, Sergey; Szegedy, Christian (2015). "Batch Normalization: Accelerating Deep Network Training by Reducing Internal Covariate Shift", the contents of which are incorporated herein by reference in their entirety. BN involves learning the two parameters γ and β, which are used to scale and shift normalised values of activations.

In the context of the neural network 20, quantising the layers 21 to different quantization levels 22 will result in features that follow different distributions. This may be a consequence of the inherent change in representational power due to the change of precision. In addition, as the bit-width is reduced, the network 20 is unable to closely approximate the feature distribution of higher bit-widths because the weight distribution significantly changes. Accordingly, the transitional BN layers 25 are configured to compensate for the distribution shift that occurs between two consecutive layers 21.

In more detail, if the bit-width of a first layer l-1 of the plurality of layers is 1≤i≤n, and the bit-width of a second layer and the bit-width of the subsequent layer l is 1≤j≤n, the method includes learning BN parameters γij and βij. In other words, BN parameters are learned for each possible combination of bit-widths of the layers l,l-1 The parameters γij and βij are dependent the bit-width j of the layer l since they depend on the current quantization level alone, irrespective of the layer's weights, which do not undergo a transition as opposed to the activations.

It has been found that introducing the transitional BN layers 25 does not induce any increase in the complexity of the network. Instead, only a small increase in network size is introduced, for example of less than 1% of the total parameter count.

It will be understood that the network 20 shown in FIGS. 2 and 3 is schematic, and that in practice the network 20 may have other layers such as normalisation layers and the like. Accordingly, the network 20 may form part of a machine learning model comprising a plurality of neural network layers and optionally other further layers.

Figure 4:
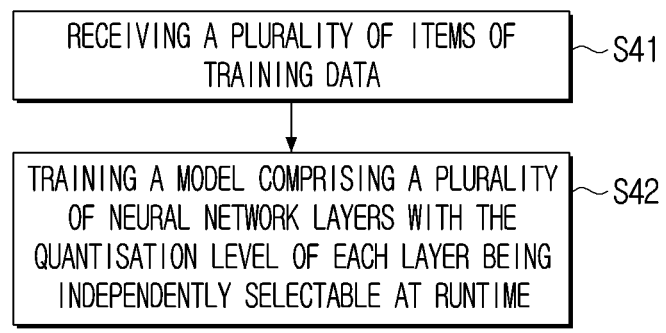
FIG. 4 is a schematic flowchart of an example method of training a machine learning, ML, model according to the present techniques.

FIG. 4 is a flowchart illustrating an example computer-implemented method for training a machine learning model according to an example of the present techniques. The method includes a first step S41 of receiving a plurality of items of training data. The method includes a second step S42 of training an ML model with the training data, the ML model comprising a plurality of neural network layers, wherein the quantisation level of each of the plurality of network layers is independently selectable at runtime. The ML model may include the neural network 20 described above.

Figure 5:
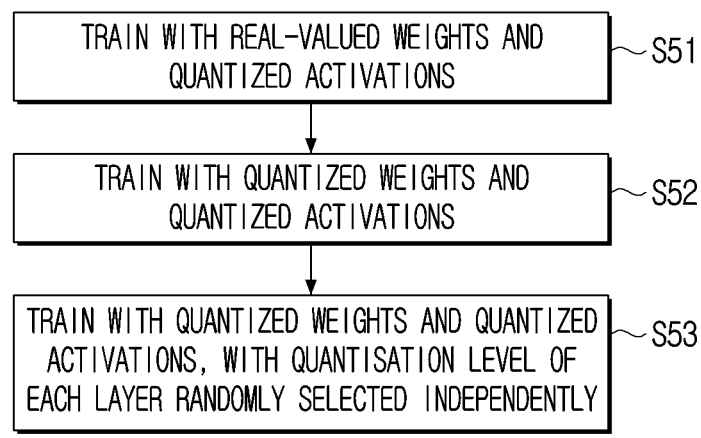
FIG. 5 is a schematic flowchart of an example method of training an ML model according to the present techniques.

FIG. 5 is a flowchart illustrating the method of FIG. 4 in further detail. Particularly, FIG. 5 illustrates a 3-stage optimisation process for training the neural network 20.

In a first step S51, the neural network 20 is trained with real-valued (i.e. non-quantised) weights, whilst the activations are quantised to different bit-widths.

In one example, the activations are quantised to a randomly selected bit-width of the plurality of bit-widths 22 at each iteration of the training during this step. In one example, at each iteration of training during the step S51, a random bit-width is selected from the predetermined set of bit-widths chosen for the trained network. For example, if the network 20 is intended to have 4 possible bit-widths of 1, 2, 3 and 4, a bit-width is selected at random from the set {1, 2, 3, 4}. In one example, the bit-widths have an equal probability of selection. The neural network 20 is then trained such that all layers 21 of the network 20 have the selected bit-width for all of its activations, for that iteration of training.

In a second step S52, the neural network 20 resulting from step S51 is trained with quantised weights and quantised activations. In other words, the training in step S52 is initialised using the model obtained in step S51.

In one example, both the weights and activations are quantised to the same randomly selected bit width at each iteration of the training during this step. Accordingly, at each iteration of training during the step S52, a random bit-width may be selected from the predetermined set of bit-widths chosen for the network. For example, if the network 20 is to have 4 possible bit-widths of 1, 2, 3 and 4, a bit-width is selected at random from the set {1, 2, 3, 4}. In one example, the bit-widths have an equal probability of selection. The neural network 20 is then trained such that all layers 21 of have the selected bit-width for all of its activations and weights, for that iteration of training.

In a third step S53, the training of the neural network 20 includes randomly selecting the bit-width of each layer 21 of the network 20 independently. Accordingly, different bit-widths 22 are used for different layers 21 in this stage of the training. In one example, the bit-width of the weights and activations of a layer 21 are the same, though in further example the weights and activations of a particular layer 21 may also be independently randomly selected.

In one example, step S53 includes randomly choosing at each iteration whether to independently select the bit-width 22 of the layers 21, or whether use same bit-width 22 for all layers. In other words, step S53 may involve randomly choosing at each iteration between: (a) the training process described in the preceding paragraph in which the bit-widths of each layer 21 are selected independently; and (b) the training process discussed hereinabove in respect of step S52.

Furthermore, step S53 may also include increasing the probability of choosing to independently select the bit-width of the layers as the training progresses. This results in the network 20 being gradually trained with more iterations of layer-wise random bit-width over time.

Put differently, there may be a probability σ at each iteration of training the network 20 of using the same bit-width 22 for all the layers 21 of the network. There is therefore also a probability of probability 1-σ, that the bit-width of each individual layer 21 is randomly selected independently of the other layers. Over time, σ is decreased. In one example, the value of σ continues to be decreased until 1-σ=k. An example value of k is 0.75.

The result of step S53 is a trained neural network with a single shared set of weights, wherein the bit-width of each layer of the network can be selected independently at runtime. Each of steps S51-S53 may be carried out using the same training scheduler. An example training scheduler that may be used is a cosine scheduler. For example, the network 20 may be trained for 160 epochs using the cosine scheduler with a warm-up of 10 epochs and no restarts. The scheduler may have a starting learning rate of 0.001 and a weight decay of 1×10-4. In one example, the AdamW technique is used for network optimisation, Adam referring to adaptive moment estimation. In other examples, the scheduler parameters, including starting learning rate, number of training epochs and warm-up epochs and weight decay rate may be varied. It will be appreciated that training hyper-parameters are task, data and network specific and may be selected empirically. It will further be appreciated that other suitable schedulers for training machine learning models having neural network layers may be employed.

The methods discussed hereinabove with respect to FIGS. 4 and 5 can be applied to a wide variety of training data, so as to train the neural network 20 for a wide variety of tasks or applications. The methods may employ training data in the form of items of image data including still images or moving images, audio data or text data. In some examples, the training data may comprise a plurality of different types or modalities of training data. In one example, each piece of training data is labelled, so that the method is a supervised training method. In other examples, the training data may comprise labelled and unlabelled data, such that the method is a semi-supervised training method.

The neural network 20 may be trained to perform classification, regression or any other suitable task. For example, the neural network 20 may be trained to carry out one of image classification, image segmentation, video compression/decompression, video encoding/decoding, speech recognition or text classification.

Figure 6:
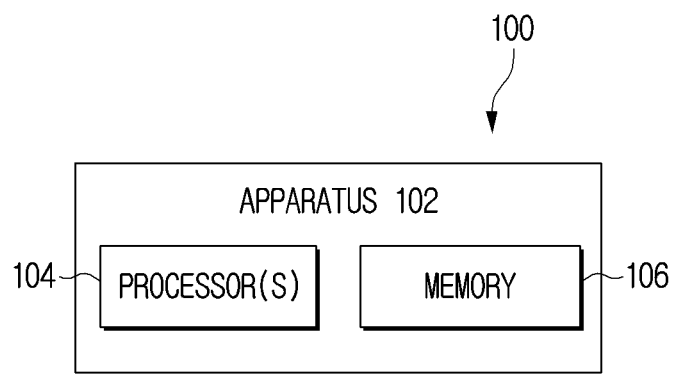
FIG. 6 is a schematic diagram of an example apparatus for training an ML model according to the present techniques.

Turning to FIG. 6, there is shown an example system 100 for training a machine learning model. The system 100 comprises at least one processor 104 coupled to memory 106. The at least one processor 104 may comprise one or more of: a microprocessor, a microcontroller, and an integrated circuit. The memory 106 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The at least one processor 104 coupled to memory 106 may be arranged to carry out the method of FIG. 4 and/or FIG. 5. In one example, the processor 104 is configured to receive a plurality of items of training data; and train the ML model with the plurality of items of training data, the ML model comprising a plurality of neural network layers, wherein the quantisation level of each of the plurality of network layers is independently selectable at runtime.

In one example, the processor 104 is configured to train the ML model with real-valued weights and quantised activations, wherein at each iteration of the training activations of each neural network layer of the ML model is quantised to the same quantisation level. The process 104 may also be configured to train the ML model with quantised weights and quantised activations, wherein at each iteration of the training weights and activations of each neural network layer of the ML model are quantised to the same quantisation level. The processor 104 may also be configured to train the ML model with quantised weights and quantised activations, wherein weights and activations of each neural network layer of the ML model are quantised to independently-selected quantisation levels.

In one example the processor 104 are comprised in a single apparatus 102. The apparatus 102 may for example be a computing device such as a server computer. In other examples, the system 100 may comprise a plurality of processors and memories distributed over a plurality of apparatuses. Accordingly, the system 100 may be a distributed computing system.

Figure 7:
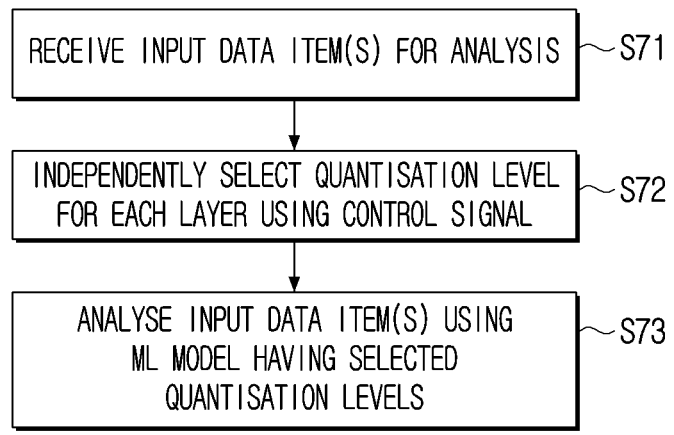
FIG. 7 is a schematic flowchart of an example method of analysing input data on a device using a trained ML model according to the present techniques.

FIG. 7 illustrates an example computer-implemented method for analysing input data on a device using a trained machine learning, ML, model. The trained ML model may be the neural network 20 discussed hereinabove, trained according to the process discussed with respect to FIGS. 5 and/or 6.

The method includes a step S71 of receiving an input data item for analysis. As discussed above, the neural network 20 may be trained to carry out one of a wide variety of tasks. Accordingly, the input data item will vary depending upon the task that the neural network 20 has been trained to carry out. For example, the input data item may comprise image data such as a still image, audio data, text data or any other suitable input data. In some examples, a plurality of input data items may be received for analysis, such as a plurality of frames of a moving image.

The method includes a step S72 of independently selecting the quantisation level for each layer of the neural network 20. In one example, the quantisation level for each layer is selected based on configuration data, for example stored in a configuration file on the device.

In other examples, a received control signal is used to set the quantisation level. For example, a processor of the device may send the control signal to the neural network 20, which may then select the quantisation level of each layer according to the control signal. Selection of the quantisation level will be discussed further hereinbelow.

In step S73, the input data item is analysed by the neural network having the selected quantisation levels. The input data item is processed through the layers of the neural network 20 to provide an output. The output may take the form of a classification result, regression result, segmented image or any other output.

Returning to step S72, various means of selecting of the quantisation level at runtime may be employed, which will now be discussed.

Figure 8:
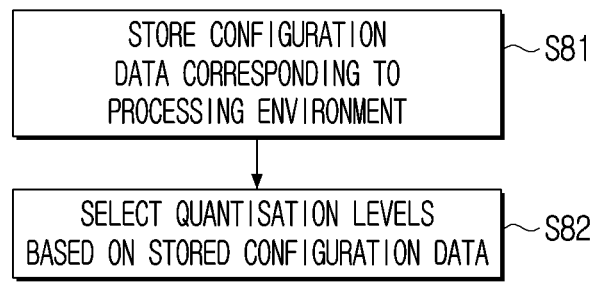
FIG. 8 is a schematic flowchart of another example method of analysing input data on a device using a trained ML model according to the present techniques.

FIG. 8 illustrates an example computer-implemented method of selecting the quantisation level. The steps of FIG. 8 may form part of step S72 of FIG. 7.

As discussed hereinabove, it may be advantageous to select quantisation levels of the network 20 so as to provide an appropriate performance/accuracy trade-off for the device and its processing environment executing the neural network 20. By "processing environment", it is meant one or more of the hardware configuration or properties (e.g. type of processor, amount of memory, etc), firmware configuration and/or operating system version in which the neural network 20 will be executed.

Accordingly, in the example, a selection of quantisation levels that provides the most appropriate trade-off may be pre-determined for the particular processing environment. For example, a bench-marking exercise or other experiments carried out in advance may allow determination of the optimal quantisation levels for a combination of hardware, firmware and operating system.

It will be appreciated that in some circumstances different selections may be determined for different hardware configurations alone, or different operating system versions alone, or different operating systems rather than in combination. In other words, the configuration data may be specific to a particular model of device (e.g. Samsung® Galaxy® Z Fold), a particular operating system (e.g. Android® 12), a particular firmware version, or the combination of two or more thereof.

The method includes a step S81 of storing configuration data comprising a selection of quantisation levels corresponding to a processing environment of a device. The configuration data may for example take the form of a configuration file. The method also includes a step S82 of selecting the quantisation levels of the layers of the network 20 based on the configuration data stored in step S81.

Figure 9:
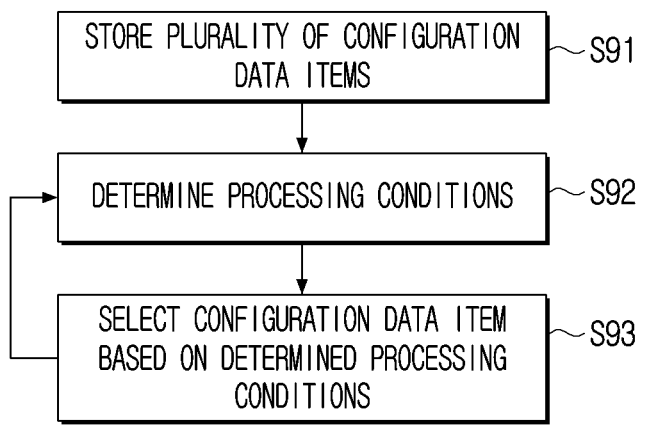
FIG. 9 is a schematic flowchart of another example method of analysing input data on a device using a trained ML model according to the present techniques.

FIG. 9 illustrates another example computer-implemented method of selecting the quantisation level for the layers of the neural network 20.

As discussed hereinabove, it may be advantageous to select quantisation levels of the network 20 so as to provide an appropriate performance/accuracy trade-off for the device based on the current processing conditions of the device. By "processing conditions", it is meant the currently available computational resource, for example including the availability of processor capacity, memory capacity, the amount of remaining battery, and so on.

The method includes a step S91 of storing a plurality of configuration data items. Each configuration data item may take the form of a configuration file. The plurality of configuration data items each correspond to a different set of processing conditions. For example, one of the configuration data items may correspond to a situation in which a relatively large amount of computational resource is available. Another of the configuration data items may correspond to a situation in which the computational resource is relatively restricted. It will be appreciated that differing numbers of configuration data items may be provided, depending on the granularity required.

In one example, each of the configuration data items may correspond to different processing conditions of present in same processing environment. In other words, configuration data items may be provided that are specific to a processing environment as well as a set of processing conditions. For example, a configuration data item may relate to a particular model of device (e.g. Samsung® Galaxy® Z Fold), a particular operating system (e.g. Android® 12), a particular firmware version or combination thereof, in conjunction with a particular set of conditions (e.g. restricted computation resource available).

As discussed above, bench-marking exercises or other experiments carried out in advance may allow determination of the optimal quantisation levels for a set of processing conditions. The method includes a step S92 of determining the processing conditions of the device. For example, this may include determining one or more of the current processor load or available processing capacity of the device; the amount of available memory of the device; the remaining battery of the device, or any other relevant metric indicative of the current processing conditions. In some examples, data relating to the processing conditions of the device may be made available by the operating system and be accessible via a suitable API or the like.

The method includes a step S93 of selecting a configuration data item of the plurality of stored configuration data items, based on the determined processing conditions. For example, if the determined processing conditions are such that there is a large amount of computational resource available, a configuration data file is selected corresponding to such processing conditions. If, on the other hand, there is very little computational resource available, a different configuration data file is selected corresponding to such processing conditions.

In one example, rules or heuristics may be used to select the appropriate configuration data item based on the processing conditions. For example, the processor usage being over a predetermined percentage, or available memory being under a certain percentage, may result in the selection of a particular configuration data item.

In other examples, machine learning may be used to select the configuration data item based on the determined processing conditions. For example, a machine learning classifier may classify the processing conditions as relating to a high-load situation, low-load situation, etc based on the determined processing conditions. The method may then include selecting the configuration data item that corresponds to the determined situation.

The steps S92 and S93 may be repeated. In other words, the method may include continually determining the processing conditions and selecting the configuration data item based on the determined processing conditions. Accordingly, as the processing conditions change during runtime, so too will the selected quantisation levels of the neural network 20. This may ensure that the optimal performance/accuracy trade-off is selected.

Figure 10:
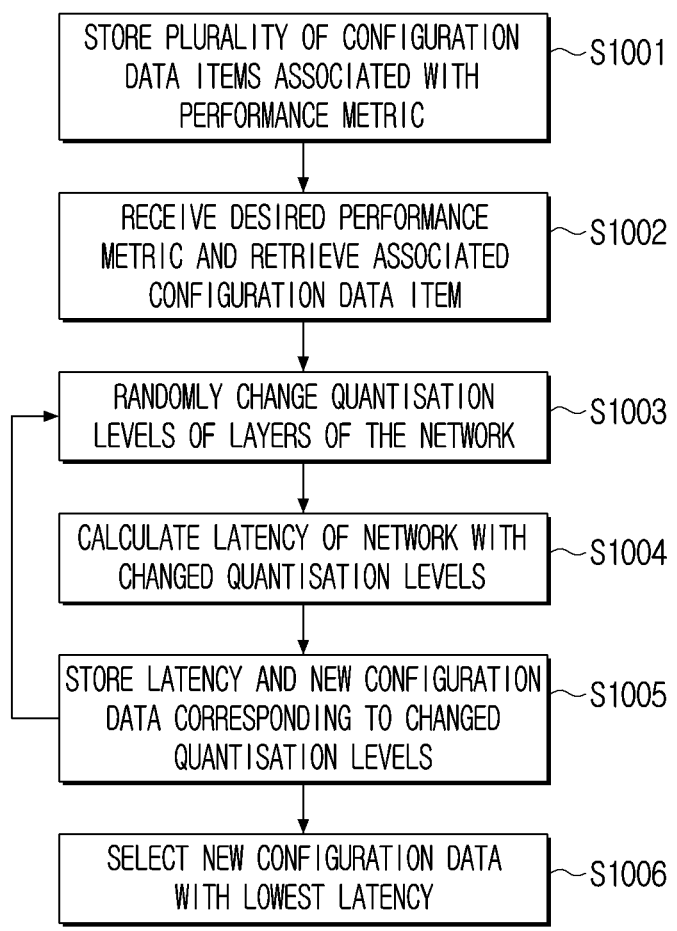
FIG. 10 is a schematic flowchart of another example method of analysing input data on a device using a trained ML model according to the present techniques.

FIG. 10 illustrates another example method of selecting the quantisation level of the layers of the neural network. In the example of FIG. 10, the quantisation levels of the neural network are adjusted dynamically, rather than by solely relying on stored configuration data.

The method may include a step S1001 of storing a plurality of configuration data items, each configuration data item associated with a performance metric representative of the configuration data item. The performance metric may for example be the accuracy of the trained model when operating with the associated configuration data item, though in other examples measures such as recall, precision, f-score etc may be employed. The stored configuration data items may be referred to as "first" configuration data items.

The stored configuration data items and associated performance metrics may be stored in a hash table. The performance metric may act as the key of the hash table, so that a configuration data item can be retrieved that corresponds to a desired performance metric, such as a particular level of accuracy.

In step S1002, at run-time a desired performance metric is received, and the associated configuration data item is retrieved. The quantisation levels of the network 20 are then set according to the configuration data.

In step S1003, the quantisation levels of one or more layers of the network 20 are randomly changed. The random change in the quantisation levels introduces noise into the configuration data. For example, the quantisation level of only a small number of the layers (e.g. under 5% of the layers in the network) may be randomly changed. In one example, the random change may be carried out at each forward pass of the network during run-time.

In step S1004, the latency of the network 20 having the randomly changed quantisation levels is calculated.

In step S1005, new (or "second") configuration data is stored, corresponding to the quantisation levels of the network 20 including the random changes. Both the latency and new configuration data are associated with the desired performance metric. In one example, the new configuration data, latency and accuracy are stored in cache memory.

Accordingly, the process effectively generates and stores new configuration data by introducing a small amount of noise, along with the measured latency of the configuration data. As the amount of noise introduced is relatively small, it can be assumed that the performance of the new configuration data will be substantially the same.

Steps S1003 to S1005 are repeated a plurality of times, so as to generate a plurality of new items of configuration data, each with associated latency.

Subsequently, in Step S1006, the new item of configuration data is selected that has the lowest latency. The quantisation levels of the network 20 are then set according to the selected configuration data.

The process of FIG. 10 described above may be periodically repeated, for example with a developer-specified frequency.

The process of FIG. 10 assists in dynamically finding the appropriate configuration for unknown devices where the latency is not known. It may also assist in re-evaluating the latency as the software-stack (such as drivers or neural engines) is updated or changes. In addition, the process does not interfere with the user-expected performance of the model.

Figure 11:
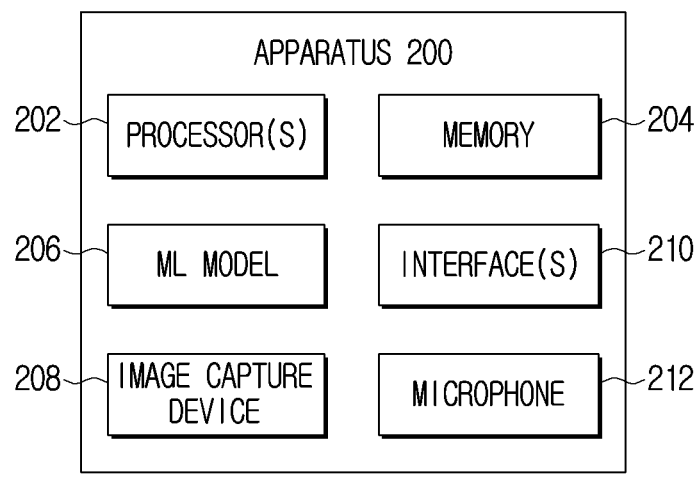
FIG. 11 is a schematic diagram of an example apparatus for analysing input data on using a trained ML model according to the present techniques.

FIG. 11 shows an example apparatus 200 for analysing input data using a trained machine learning model.

The apparatus 200 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example apparatus.

The apparatus 200 comprises at least one processor 202 coupled to memory 204. The at least one processor 202 may comprise one or more of: a microprocessor, a microcontroller, and an integrated circuit. The memory 204 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The memory 204 stores a trained ML model 206. The trained ML model 206 may be the neural network 20 discussed herein. The memory 204 may also store configuration data, as discussed herein.

The apparatus 200 may also comprise an image capture device 108 for capturing images which are to be processed by the trained ML model 106. The apparatus 100 may also comprise an interface 110 for receiving images which are to be processed by the trained ML model 106. In still further examples, the apparatus 200 may comprise a microphone 112 for capturing audio signals for processing by the trained ML model 106. The interface 110 may also receive audio signals.

The at least one processor 202 may be arranged to carry out the methods discussed hereinabove in relation to FIGS. 7-10.

The at least one processor 202 may be arranged to receive at least one input data item for analysis, for example including image data, audio data, or text data. The input data may be received via the interface 110, image capture device 108 or microphone 112. In some examples, a plurality of input data items may be received for analysis, such as a plurality of frames of a moving image.

The at least one processor 202 also may be arranged to independently select a quantisation level for each of the plurality of neural network layers at runtime. For example, the processor 202 may select the quantisation level for each layer based on configuration data stored in the memory 204, or may dynamically adjust the quantisation levels at runtime.

The at least one processor 202 may be further arranged to analyse the received input data item using the neural network having the selected quantisation levels.

The methods, systems and apparatuses described herein may advantageously provide a neural network that allows the independent selection of bit-widths of each layer at runtime. Accordingly, a single training process results in a neural network that can be deployed to a wide variety of hardware and operated in a wide variety of processing conditions, with the bit-widths adjusted on-the-fly to suit the available computational resource. This avoids the requirement to train and maintain device-specific neural network models.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for analysing input data on a device using a trained machine learning, ML, model comprising a plurality of neural network layers, the method comprising:
   receiving at least one input data item for analysis;
   independently selecting a quantisation level for each of the plurality of neural network layers at runtime;
   analysing the received input data item using the selected quantisation levels;
   storing first configuration data comprising a selection of quantisation levels;
   generating a plurality of items of second configuration data from the first configuration data by introducing noise into the first configuration data;
   calculating a latency associated with each of the plurality of items of second configuration data; and
   selecting an item of second configuration data of the plurality of items of second configuration data having a lowest latency,
   wherein the trained ML model comprises a transitional batch-normalisation layer disposed between a first neural network layer and a second neural network layer of the plurality of neural network layers,
   wherein the transitional batch-normalisation layer is configured to compensate for a change in feature distribution between a quantisation level of the first neural network layer and a quantisation level of the second neural network layer.

2. The method of claim 1, wherein the quantisation level is selected from a pre-defined set of quantisation levels.

3. The method of claim 1, wherein the ML model uses a single shared set of weights.

4. The method of claim 1, wherein the input data items comprise image data, audio data or text data.

5. The method of claim 1, wherein the ML model carries out one of image classification, image segmentation, video compression/decompression, video encoding/decoding, speech recognition or text classification.

6. The method of claim 1, comprising:
   storing configuration data, the configuration data comprising a selection of quantisation levels corresponding to a processing environment of a device upon which the ML model will be executed, and
   selecting the quantisation levels of the layers of the network based on the stored configuration data,
   wherein the processing environment includes one or more of the hardware configuration or properties, firmware configuration and/or operating system version of the device.

7. The method of claim 1, comprising:
   storing a plurality of configuration data items, each configuration data comprising a selection of quantisation levels;
   determining processing conditions of the device, and
   selecting a configuration data item of the plurality of stored configuration data items, based on the determined processing conditions,
   wherein the processing conditions include available computational resource of the device or an amount of remaining battery.

8. The method of claim 7, wherein each of the configuration data items corresponds to different processing conditions present in same processing environment.

9. An apparatus comprising:

at least one processor, coupled to memory, arranged to analyse input data using a trained machine learning, ML, model by receiving at least one input data item for analysis;

independently selecting a quantisation level for each of the plurality of neural network layers at runtime;

analysing the received input data item using the selected quantisation levels;

storing first configuration data comprising a selection of quantisation levels;

generating a plurality of items of second configuration data from the first configuration data by introducing noise into the first configuration data;

calculating a latency associated with each of the plurality of items of second configuration data; and selecting an item of second configuration data of the plurality of items of second configuration data having a lowest latency, wherein the trained ML model comprises a transitional batch-normalisation layer disposed between a first neural network layer and a second neural network layer of the plurality of neural network layers, wherein the transitional batch-normalisation layer is configured to compensate for a change in feature distribution between a quantisation level of the first neural network layer and a quantisation level of the second neural network layer.

* * * * *